United States Patent [19]

Tanaka et al.

[11] 4,000,331
[45] Dec. 28, 1976

[54] PROCESS FOR THE PRODUCTION OF CRAB ANALOGUE MEATS

[75] Inventors: Kenji Tanaka, Kawagoe; Fumiyo Namazue, Sayama; Ryutaro Ozawa, Tokyo; Eiji Yokomizo, Kawagoe, all of Japan

[73] Assignee: Nisshin Flour Milling Co., Ltd., Japan

[22] Filed: Sept. 3, 1975

[21] Appl. No.: 609,910

[30] Foreign Application Priority Data

Sept. 10, 1974   Japan ............................ 49-103445

[52] U.S. Cl. .............................. 426/574; 426/656; 426/802
[51] Int. Cl.² ........................................... A23J 3/00
[58] Field of Search ........... 426/574, 643, 656, 802

[56] References Cited

UNITED STATES PATENTS

| | | | |
|---|---|---|---|
| 3,290,152 | 12/1966 | Hartman | 426/656 X |
| 3,925,343 | 12/1975 | Hampton et al. | 426/656 X |

*Primary Examiner*—A. Louis Monacell
*Assistant Examiner*—R. A. Yoncoskie
*Attorney, Agent, or Firm*—Hill, Gross, Simpson, Van Santen, Steadman, Chiara & Simpson

[57] ABSTRACT

A process for the production of crab analogue meats from wheat gluten is disclosed. Meat material of finely fibriform structure typical of crab meats is produced by blending reducing agent and foaming agent with wheat gluten, and thereafter subjecting the resulting blended material to gelation with heat and stirring.

6 Claims, No Drawings

PROCESS FOR THE PRODUCTION OF CRAB ANALOGUE MEATS

BACKGROUND OF THE INVENTION

This invention relates to processing of crab analogue meats, and more particularly to a process for the production of crab analogue meats by fiberizing wheat gluten.

Heretofore, numerous food products have been produced from tissual or fibrous vegetable proteins, and have been sold as analogue meats resembling the tastes and appearances of beef, pork, fowl or chicken meats. However, the development of crab analogue meats remained far backward. The primary reason for this was due to the difficulty involved in producing meat material of finely fibriform structure typical of crab meats. Such fibrous meat material cannot be readily produced from insoluble proteins as for example from wheat gluten. The only device thought out was to form fibrous meat material from soluble proteins such as from soyabean proteins by spinning, but through such process the production of fibrous meat material cannot be put on mass-production base.

The inventors, through extensive research efforts, have found a novel process quite easy to perform for the production of fibrous meat material from wheat gluten for use in crab analogue meats.

SUMMARY OF THE INVENTION

The present invention is therefore aimed at the provision of a process for the production of crab analogue meats of finely fibriform structure from wheat gluten.

Briefly stated, there is provided a process for producing crab analogue meats of finely fibriform structure by blending reducing agent and foaming agent with wheat gluten and thereafter subjecting the resulting blended material to gelation within heated water by stirring it in a fixed direction. To be more specific, as the S-S linkage existing in molecules of the wheat gluten is cleaved by the function of the reducing agent, the wheat gluten is made ductile and plasticized. Furthermore, by subjecting the blended material to gelation in heated water by stirring it in a predetermined direction, the foaming agent blended serves to make the wheat gluten finely fibrous.

DETAILED DESCRIPTION OF THE PREFERRED EMBODIMENT

The term wheat gluten as used herein includes wet gluten or vital gluten. The reducing agent used in the present invention may be of any type as long as it is applicable to food products. Typical examples are sodium sulfite, potassium sulfite, sodium bisulfite, potassium bisulfite, reduced glutathione (GSH), cystein and hydrazine. The reducing agent may be used alone or two or more of these may be combined and used. The reducing agent is normally used in the range of 0.001 to 0.3 percent by weight of the wheat gluten (vital gluten).

The foaming agent should also be the one applicable to foods, but should release gas at room temperature or during heating operation after being blended with the wheat gluten and placed in water. Sodium bicarbonate, potassium bicarbonate, sodium carbonate, and potassium carbonate are the examples of the foaming agent. The foaming agent is normally used in the range of 0.1 to 3 percent by weight of the wheat gluten. Furthermore, in order to formulate a fibrous structure typical of crab meats, foods in powdery form such as starch, casein, soyabean powder may be added. Although the use of these food powders is optional, their quantity should be in the range of 10 to 60% of weight of the wheat gluten.

A preferable way of blending is to merely knead the above described agents with wheat gluten by means of for example a grinder. In kneading the material, a suitable amount of water may be added. The resulting blended material is then placed in water in amounts of 1 to 15 parts based on the weight of the wheat gluten and thereafter subjected to gelation with heat and stirring. When performing the gelation, it is preferable to slowly raise the temperature of the water. As for example, the starting temperature may be between 50° – 60° C. While stirring, the temperature is gradually increased to the boiling point. In this instance, the peripheral velocity of stirring should be approximately from 0.5 to 5.0 meters per second. Stirring at slower speed than this would result in the formation of objectionably thick and heavy fibrous material which are far from comparison with crab meats. Stirring at higher speed than the above indicated range would result in shredded fibrous material. It is therefore important to note that the length of the resulting fibrous material varies with the speed of stirring. In case the stirring is performed within the velocity range of 0.5 to 1.0 meters per second, part of the resulting fibrous materials might be flocked together. Such flocked material can be easily adjusted to a desired dimension by agitation in water by a mixer such as a Waring blender.

It should be noted that the reducing agent herein used also presents bleaching effect when blended with wheat gluten, that is to say, the reducing agent would make the resulting fibrous material white in color. Fibrous material colored in red may be proportionately mixed with white ones so as to become more closely comparable in many respects to real crab meats. The coloring can be performed by adding a suitable amount of natural food dyes as for example "MONASCOLOR" (tradename) to the wheat gluten simultaneously with the addition of reducing agent and foaming agent. Colored fibrous material thus made is then mixed with white ones. Thereafter, the mixture is dehydrated.

Seasoning of the analogue meats can be done by adding an appropriate amount of spices and/or flavoring matters during the blending operation, or alternatively after the completion of the process.

The invention will be further described by way of the following examples which are merely illustrative but are not intended to limit the invention thereto.

EXAMPLE 1

To 1 kg wet wheat gluten (70% water) were added 0.2 g sodium bisulfite and 2 g sodium bicarbonate and then blended thoroughly with a grinder. The resulting blended material (having a temperature of about 70° C) was fed into a 50 l stainless vat containing 13l of water (50° C). The blended material was subjected to gelation with heat and stirring at 300 rpm. The starting temperature of the water was 50° C. While stirring, the temperature was constantly raised till it reached the boiling point. The stirring was further continued for three minutes after the boiling thereby completed the gelation. Following this process, 0.02 g sodium bisulfite, 0.2 g sodium bicarbonate and 3.6ml of "MONASCO G" (tradename: manufactured by Taito Kabushiki Kaisha) a red dye made by extracting coloring matter from *Monascus purpureus* with 70% propylene glycol were added to and blended with 100 g wheat gluten. The resulting blended material was treated in the same manner as already described. Thereafter, the fibrous material thus made was mixed with the ones already made in the previous process. The mixture was then dehydrated.

EXAMPLE 2

2 kg wet wheat gluten (70% water) was placed in a silent cutter and then added to and blended with 20 ml of 1% sodium sulfite solution, and 4 g sodium carbonate. The blended material was stirred and heated in the same manner as described in Example 1. The resulting material was then mixed with the red material yielded from the process of Example 1. The mixture was then dehydrated.

EXAMPLE 3

To 1 kg wet wheat gluten were added 0.4 g reduced glutathione and 3 g sodium bicarbonate. The process of Example 1 was followed. After this, 0.04 g reduced glutathione, 0.2 g sodium bicarbonate and 3.6 ml of "MONASCO A" (tradename: manufactured by Taito Kabushiki Kaisha) a red dye made by extracting coloring matter from *Monascus purpureus* in 70% ethanol were added to 100 g wheat gluten and treated according to the recipe shown in Example 1. The resulting material was then mixed with that yielded in the former process. The mixture was dehydrated.

EXAMPLE 4

To 1 kg of wet wheat gluten (70% water) were added 3 g sodium sulfite and 2 g of sodium bicarbonate and blended thoroughly with a grinder. The blended material (55° C) was then fed in a stainless vat equipped with a stirring mechanism and containing 1 l of water (76° C). The stirring was commenced at 70 rpm and subjected to gelation. The temperature of water was raised to the boiling point. Stirring was further continued for three minutes after the boiling. After the gelation, the resulting product was immediately put in a juice mixer and mixed with water for a period of the order of seconds and then dehydrated.

What is claimed is:

1. A process for preparing crab analogue meat material of finely fibriform structure which comprises combining a wheat gluten with an edible reducing agent capable of breaking down the S-S linkages in wheat gluten and with an edible foaming agent capable of releasing gas when the mixture is placed in water and heated to its boiling point, and heating the resulting mixture in water to the boiling point while stirring the mixture at a peripheral stirring velocity of from 0.5 to 5 meters per second whereby the wheat gluten is made fibrous.

2. The process as claimed in claim 1 wherein said reducing agent is selected from the group consisting of sodium bisulfite, sodium sulfite and reduced glutathione.

3. The process as claimed in claim 1 wherein said foaming agent is selected from the group consisting of sodium bicarbonate and sodium carbonate.

4. The process as claimed in claim 1 wherein said reducing agent is added in an amount of from 0.001 to 0.3% by weight and said foaming agent is added in an amount of from 0.1 to 3% by weight of said wheat gluten.

5. The process as claimed in claim 1 wherein the heating is commenced at a temperature of from 50° to 60° C.

6. The process as claimed in claim 1 wherein the mixture includes water in an amount of 1 to 15 parts based upon the weight of the wheat gluten.

* * * * *